(12) United States Patent
Regnier et al.

(10) Patent No.: US 6,933,887 B2
(45) Date of Patent: *Aug. 23, 2005

(54) METHOD AND APPARATUS FOR ADAPTING ANTENNA ARRAY USING RECEIVED PREDETERMINED SIGNAL

(75) Inventors: John A. Regnier, Palm Bay, FL (US); James A. Proctor, Jr., Melbourne, FL (US); Michael J. Lynch, Merritt Island, FL (US); Thomas E. Gorsuch, Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 121 days.

This patent is subject to a terminal disclaimer.

(21) Appl. No.: 10/282,928

(22) Filed: Oct. 28, 2002

(65) Prior Publication Data

US 2003/0222818 A1 Dec. 4, 2003

(Under 37 CFR 1.47)

Related U.S. Application Data

(63) Continuation-in-part of application No. 09/776,558, filed on Feb. 2, 2001, now Pat. No. 6,473,036, which is a continuation-in-part of application No. 09/579,084, filed on May 25, 2000, now Pat. No. 6,304,215, which is a division of application No. 09/210,117, filed on Dec. 11, 1998, now Pat. No. 6,100,843, which is a continuation of application No. 09/157,736, filed on Sep. 21, 1998, now abandoned.

(51) Int. Cl.$^7$ ................................................. H01Q 3/24
(52) U.S. Cl. ...................................... 342/372; 342/373
(58) Field of Search ................................. 342/367, 368, 342/372, 373; 455/422.1, 426.1, 426.2

(56) References Cited

U.S. PATENT DOCUMENTS 6,473,036 B2 * 10/2002 Proctor, Jr. .................. 342/372

* cited by examiner

*Primary Examiner*—Dao Phan
(74) *Attorney, Agent, or Firm*—Hamilton, Brook, Smith & Reynolds, P.C.

(57) ABSTRACT

An antenna apparatus that can increase capacity in a wireless communication system is disclosed. The antenna operates in conjunction with a station and comprises a plurality of antenna elements, each coupled to a respective weight control component to provide a weight to the signal transmitted from (or received by) each element. The weight for each antenna element is adjusted to achieve optimum reception during, for example, an idle mode when a pilot signal is received. The antenna array creates a beam former for signals to be transmitted from the mobile station, and a directional receiving array to more optimally detect and receive signals transmitted from the base station. By directionally receiving and transmitting signals, multipath fading and intercell interference are greatly reduced. The weights are adjusted in a coarse and a fine mode. In the coarse mode all the weight control components are jointly adjusted or changed so that the antenna beam scans through a predetermined sector of a circle until a signal quality metric of the received signal is optimized. The coarse adjustment mode is followed by a fine adjustment mode during which the weights of are independently adjusted to further optimize the signal quality metric.

27 Claims, 7 Drawing Sheets

METHOD AND APPARATUS FOR ADAPTING ANTENNA ARRAY USING RECEIVED PREDETERMINED SIGNAL

RELATED APPLICATIONS

This application is a continuation-in-part of U.S. patent application Ser. No. 09/776,558 filed Feb. 2, 2001, now U.S. Pat. No. 6,473,036, entitled "Method and Apparatus For Adapting Antenna Array To Reduce Adaptation Time While Increasing Array Performance," which is itself a continuation-in-part of U.S. patent application Ser. No. 09/579,084 filed May 25, 2000, now U.S. Pat. No. 6,304,215, entitled "Adaptive Antenna For Use In Same Frequency Networks," which is a divisional application of U.S. patent application Ser. No. 09/210,117 filed Dec. 11, 1998, now U.S. Issued Pat. No. 6,100,843, entitled "Adaptive Antenna for use in Same Frequency Networks," which is a continuation application of U.S. patent application Ser. No. 09/157,736 filed Sep. 21, 1998 now abandoned entitled "Method and Apparatus Providing an Adaptive Antenna For Use in Same Frequency Networks". The entire teachings of all of the above applications are incorporated herein by reference.

BACKGROUND OF THE INVENTION

This invention relates to mobile (or portable) cellular communication systems, and more particularly to an antenna apparatus for use by mobile stations to provide beam forming transmission and reception capabilities.

Widely deployed communication systems, such as cellular mobile telephone systems, provide wireless communications between a base station and one or more mobile stations. The base station is typically a computer controlled set of transceivers that are interconnected to a land-based public switched telephone network (PSTN). The base station includes an antenna apparatus for sending forward link radio frequency signals to the mobile stations. The base station antenna also receives reverse link radio frequency signals transmitted from each mobile unit. Each mobile station also contains an antenna apparatus for the reception of the forward link signals and for transmission of the reverse links signals. A typical mobile station is a digital cellular telephone handset or a personal computer coupled to a cellular modem. In certain cellular systems, multiple mobile stations may transmit and receive signals on the same frequency, but in different time slots or with different modulation codes, to distinguish signals sent to or received from individual stations.

Another increasingly popular type of wireless data communication system is the Wireless Local Area Network (WLAN) such as specified by the Institute for Electrical and Electronic Engineers (IEEE) standard 802.11a and its variants 802.11b and 802.11g. Such WLANs are similar to cellular systems in that a coverage area is divided into cells (called Basic Service Sets or BSS in the WLAN nomenclature) that are controlled by a control base station, known as an Access Point. The remote mobile stations, as in a cellular system, then use the base station to access a communication network. WLANs are another type of wireless communication system in which radio frequency channels are shared.

The most common type of antenna for transmitting and receiving signals at a mobile station is a monopole or omnidirectional antenna. This type of antenna consists of a single wire or antenna element that is coupled to a transceiver within the station. The transceiver receives reverse link signals to be transmitted from circuitry within the station and modulates the signals onto a carrier signal at a specific frequency assigned to that station. The modulated carrier signal is transmitted by the antenna element. Forward link signals received by the antenna element at a specific frequency are demodulated by the transceiver and supplied to processing circuitry within the mobile station.

The signal transmitted from a monopole antenna is omnidirectional in nature. That is, the signal is sent with the same signal strength in all directions in a generally horizontal plane. Reception of a signal with a monopole antenna element is likewise omnidirectional. A monopole antenna does not differentiate in its ability to detect a signal in one direction versus detection of the same or a different signal coming from another direction. Generally, a monopole antenna does not produce significant radiation in the azimuth direction. The antenna pattern is commonly referred to as a donut shape with the antenna element located at the center of the donut hole.

A second type of antenna that has been used by mobile stations is described in U.S. Pat. No. 5,617,102. The system described therein provides a directional antenna comprising two antenna elements mounted on the outer case of a laptop computer, for example. The system includes a phase shifter attached to each element. The phase shifter may be switched on or off to effect the phase of signals transmitted or received during communications to and from the computer. By switching the phase shifters on and regulating the amount of phase shift imparted to the signals input thereto, the antenna pattern (which applies to both the receive and transmit modes) may be modified to provide a concentrated signal or beam in the selected direction. This is referred to as an increase in antenna gain or directionality. The dual element antenna of the cited patent thereby directs the transmitted signal into predetermined quadrants or directions to allow for changes in orientation of the station relative to the base station, while minimizing signal loss due to the orientation change. In accordance with the antenna reciprocity theorem, the antenna receive characteristics are similarly effected by the use of the phase shifters.

Wireless systems in which the mobile stations must share access to radio channels are recognized as being interference limited systems. That is, as more mobile stations become active in a cell and in adjacent cells, frequency interference becomes greater and thus error rates increase. As error rates increase, to maintain signal and system integrity, the operator must decrease the maximum data rates allowable. Thus, another method by which data rate can be increased is to decrease the number of active mobile stations, thus clearing the airwaves of potential interference. However, this is rarely an effective mechanism to increase data rates due to the lack of priority assignments to the system users.

SUMMARY OF THE INVENTION

Problems of the Prior Art

Various problems are inherent in prior art antennas used on mobile stations in wireless communications systems. One such problem is called multipath fading. In multipath fading, a radio frequency signal transmitted from a sender (either a base station or mobile station) may encounter interference on route to the intended receiver. The signal may, for example, be reflected from objects, such as buildings that are not in the direct path of transmission, but that redirect a reflected version of the original signal to the receiver. In such instances, the receiver receives two versions of the same radio signal; the original version and a reflected version. Each received signal is at the same frequency, but the reflected signal may be out of phase with the original due to the reflection and consequent longer transmission path. As a result, the original and reflected signals may partially cancel each other out (destructive interference), resulting in fading or dropouts in the received signal, hence the term multipath fading.

Single element antennas are highly susceptible to multipath fading. A single element antenna has no way of determining the direction from which a transmitted signal is sent and cannot be tuned or attenuated to more accurately detect and receive a signal in any particular direction. Its directional pattern is fixed by the physical structure of the antenna components.

The dual element antenna described in the aforementioned reference is also susceptible to multipath fading, due to the symmetrical and opposing nature of the hemispherical lobes formed by the antenna pattern when the phase shifter is activated. Since the lobes created in the antenna pattern are more or less symmetrical and opposite from one another, a signal reflected in a reverse direction from its origin can be received with as much power as the original signal that is received directly. That is, if the original signal reflects from an object beyond or behind the intended receiver (with respect to the sender) and reflects back at the intended receiver from the opposite direction as the directly received signal, a phase difference in the two signals can create destructive interference due to multipath fading.

Another problem present is inter-cell interference. Most systems have a base station located at the center of a cell (or the center of a BSS, in the case of a WLAN). The distance from the edge of a cell to its base station is typically driven by the maximum amount of power that is to be required to transmit an acceptable signal from a mobile station located near the edge of the cell to that cell's base station (i.e., the power required to transmit an acceptable signal a distance equal to the radius of one cell).

Intercell interference occurs when a mobile station near the edge of one cell transmits a signal that crosses over the edge into a neighboring cell and interferes with communications taking place within the neighboring cell. Typically, intercell interference occurs when similar frequencies are used for communications in neighboring cells. The problem of intercell interference is compounded by the fact that stations near the edges of a cell typically use higher transmit powers so that the signals they transmit can be effectively received by the intended base station located at the cell center. Consider that the signal from another mobile station located beyond or behind the intended receiver may be arrive at the base station at the same power level, representing additional interference.

The intercell interference problem is exacerbated in Code Division Multiple Access (CDMA), since the stations in adjacent cells may typically be transmitting on the same frequency at the same time. For example, generally, two stations in adjacent cells operating at the same carrier frequency but transmitting to different base stations will interfere with each other if both signals are received at one of the base stations. One signal appears as noise relative to the other. The degree of interference and the receiver's ability to detect and demodulate the intended signal is also influenced by the power level at which the stations are operating. If one of the stations is situated at the edge of a cell, it transmits at a higher power level, relative to other units within its cell and the adjacent cell, to reach the intended base station. But, its signal is also received by the unintended base station, i.e., the base station in the adjacent cell. Depending on the relative power level of two same-carrier frequency signals received at the unintended base station, it may not be able to properly identify a signal transmitted from within its cell from the signal transmitted from the adjacent cell. What is needed is a way to reduce the station antenna's apparent field of view, which can have a marked effect on the operation of the forward link (base to the mobile station) by reducing the apparent number of interfering transmissions received at a base station. A similar improvement is needed for the reverse link, so that the transmitted signal power needed to achieve a particular receive signal quality can be reduced.

BRIEF DESCRIPTION OF THE PRESENT INVENTION

The present invention provides an inexpensive antenna apparatus for use with a mobile or portable station in a wireless same-frequency communications system, such as a CDMA cellular communications system or WLAN system.

The invention provides a mechanism and method for efficiently configuring the antenna apparatus to maximize the effective radiated and/or received energy. The antenna apparatus includes multiple antenna elements and a like number of adjustable weight control components. As is well known in the art, the weight control components are controllable to adjust the phase, amplitude and/or delay of the signal coupled to each of the antenna elements. The weight control components (e.g., phase shifter, delay line, amplifier with variable gain) are jointly and independently operable to affect the direction of reverse link signals transmitted from the station on each of the antenna elements and the direction of forward link signals transmitted from the station.

The antenna controller provides a coarse and a fine adjustment for the weight control components. First, the controller jointly controls each of the weight control components to effect the phase of the signal input to each of the antenna elements so that the antenna is pointed generally in a given direction. The controller then shifts to an independent mode where each of the weight control components is independently adjusted to fine tune the antenna pointing direction.

The proper adjustment of the weight control components in the independent mode can, for example, be determined by monitoring an optimum response to a predetermined signal transmitted from the base station and received by the mobile station.

The exact nature of the predetermined signal depends upon the type of wireless communication system in which the invention is deployed. For a cellular system, the predetermined signal would typically be a pilot channel signal or access channel signal. In a WLAN system, the predetermined signal can be a beacon frame, Barker sequence, preamble sequence, or other predetermined bit pattern. In general, training sequences, preambles, and similar apriori known signals can also be used for predetermined signal.

The antenna apparatus thus acts as a beam former for transmission of signals from the mobile station and acts as a directional antenna for signals received by the mobile station. Through the use of an array of antenna elements, each having a programmable weight control component for forming the antenna beam as desired, the antenna apparatus increases the effective transmit power per bit transmitted. Thus, the number of active mobile stations in a cell may remain the same while the antenna apparatus of this invention increases data rates for each station beyond those achievable by prior art antennas. Alternatively, if data rates are maintained at a given rate, more mobile stations may become simultaneously active in a single cell using the antenna apparatus described herein. In either case, the capacity of a cell is increased, as measured by the sum total of data being communicated at any given time.

Forward link communications capacity can be increased as well, due to the directional reception capabilities of the antenna apparatus. Since the antenna apparatus is less susceptible to interference from adjacent cells, the forward link system capacity can be increased by adding more users or by increasing cell radius size.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

A description of preferred embodiments of the invention follows.

Figure 1:
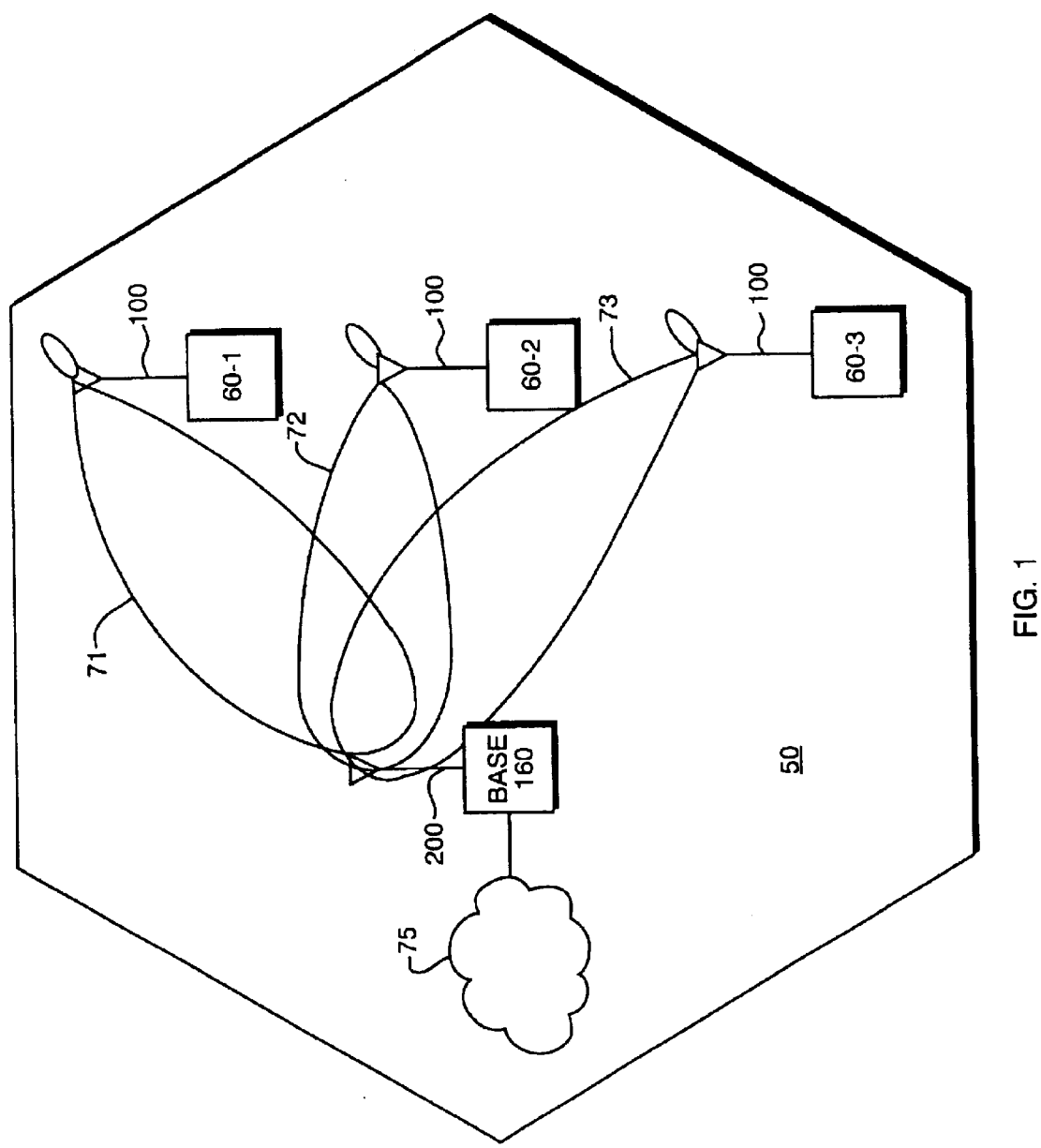
FIG. 1 illustrates a cell of a wireless communications system.

FIG. 1 illustrates a typical wireless communication system such as a CDMA cellular communication system. The cell 50 represents a physical area in which mobile stations 60-1 through 60-3 communicate with a centrally located base station 160. One or more mobile stations 60 are equipped with an antenna 100 configured according to the present invention. The mobile stations 60 are provided with wireless data and/or voice services by the system operator and can connect devices such as, for example, laptop computers, portable computers, personal digital assistants (PDAs) or the like through base station 160 to a network 75, which can be the public switched telephone network (PSTN), a packet switched computer network, such as the Internet, a public data network or a private intranet. The base station 160 can communicate with the network 75 over any number of different available communications protocols such as primary rate ISDN, or other LAPD based protocols such as IS-634 or V5.2, or even TCP/IP if network 75 is a packet based Ethernet network such as the Internet. The stations 60 are typically mobile in nature and may travel from one location to another while communicating with the base station 160. As the stations leave one cell and enter another, the communications link is handed off from the base station of the exiting cell to the base station of the entering cell.

FIG. 1 illustrates one base station 160 and three mobile stations 60 in a cell 50 by way of example only and for ease of description of the invention. The invention is applicable to systems in which there are typically many more mobile stations 60 communicating with one or more base stations 160 in an individual cell, such as the cell 50.

It is also to be understood by those skilled in the art that FIG. 1 may be a standard cellular type communications system employing signaling schemes such as a CDMA, TDMA, GSM or others in which the radio channels are assigned to carry data and/or voice between the base stations 104 and stations 60. In a preferred embodiment, FIG. 1 is a CDMA-like system, using code division multiplexing principles such as those defined in the IS-95B standards for the air interface.

But it should be understood that FIG. 1 is also representative of other types of wireless systems. For example, a Wireless Local Area Network (WLAN) operating in accordance with IEEE Standard 802.11b has one or more control base stations 160 (also referred to correctly in the 802.11 parlance as Access Points). WLANs are similar to cellular systems in that each base stations 160 services a number of remote mobile stations 60 that are active at the same time. So, the reference to base station 160 here is equally applicable to WLAN Access Points.

The invention provides the mobile stations 60 with an antenna 100 that provides directional reception of forward link radio signals transmitted from the base station 160, as well as directional transmission of reverse link signals, via a process called beam forming, from the mobile stations 60 to the base station 160. This concept is illustrated in FIG. 1 by the example beam patterns 71 through 73 that extend outwardly from each mobile station 60 more or less in a direction for best propagation toward the base station 160. By being able to direct transmission more or less toward the base station 160, and by being able to directively receive signals originating more or less from the location of the base station 160, the antenna apparatus 100 reduces the effects of intercell interference and multipath fading for the mobile stations 60. Moreover, since the transmission beam patterns 71, 72 and 73 extend outward in the direction of the base station 160 but are attenuated in most other directions, less power is required for transmission of effective communications signals from the mobile stations 60-1, 60-2 and 60-3 to the base station 160.

Figure 2A:
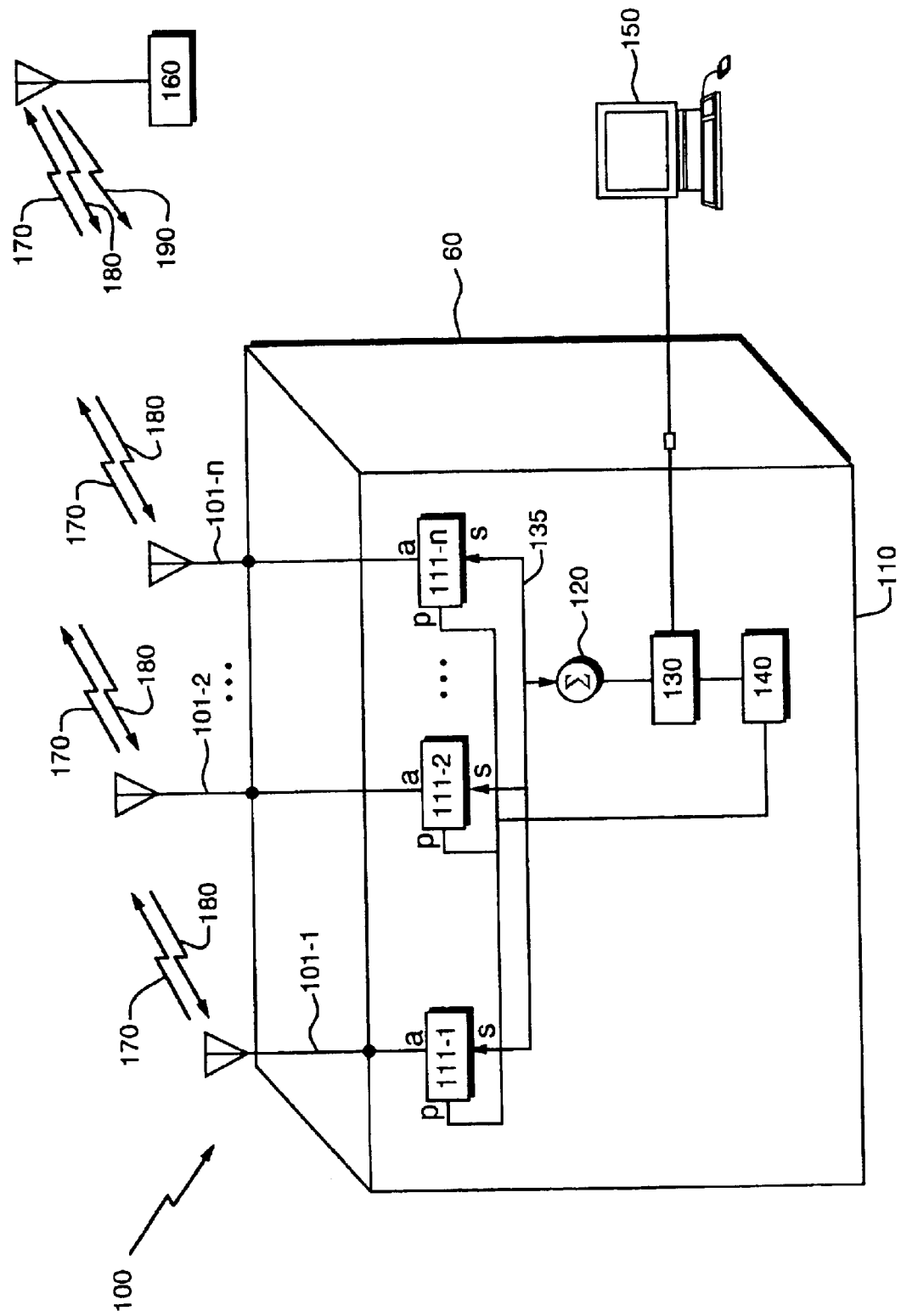
FIG. 2a illustrates one configuration of an antenna apparatus used by a mobile station.

FIG. 2a illustrates a detailed view of a mobile station 60 and an associated antenna apparatus 100 configured according to one embodiment of the present invention. Antenna apparatus 100 includes a platform or housing 110 upon which are mounted a plurality of antenna elements 101-1, 101-2, ..., 101-n (collectively referred to herein as the antenna elements 101). Within housing 110, the antenna apparatus 100 includes weight control components 111-1, 111-2, ..., 111-n (collectively, the weights 111) for adjusting the amplitude, phase or both the amplitude and phase of the signal received by or transmitted from each respective element 101-1, 101-2, ..., 101-n, a bi-directional summation network or splitter/combiner 120, a transceiver 130, and a controller 140, which are all interconnected via a bus 135. As illustrated, the antenna apparatus 100 is coupled via the transceiver 130 to a laptop computer 150 (not drawn to scale). The antenna 100 provides the laptop computer 150 with wireless data communication services via forward link signals 180 transmitted from the base station 160 and reverse link signals 170 transmitted to the base station 160.

In one embodiment, each antenna element 101 may be disposed on the surface of the housing 110. For example, if the housing is a rectangular box, four elements 101 may be respectively positioned at locations corresponding to the corners of a rectangle (in one embodiment the rectangle is a square), and a fifth antenna element 101 at a location corresponding to the center of the rectangle. The distance between each element 101 is great enough so that the relationship between a signal received by more than one element 101 will be out of phase with other elements that also receive the same signal, assuming all elements 101 have the same setting for their respective weight control components 111. However, n can be any convenient number.

The weight control components 111 are both dependently and independently adjustable to affect the directionality of signals to be transmitted and/or received to or from the station (i.e., laptop computer 150 in this example). By properly adjusting the weight control components (i.e., the weights) for each element 101 during signal transmission, a composite beam is formed that is positionally directed toward the base station 160. That is, the optimal arrangement for the weight control components for sending a reverse link signal 170 from the antenna 100 is a setting for each antenna element 101 that creates a directional reverse link signal beam former. The result is an antenna 100 that directs a stronger reverse link signal pattern in the direction of the intended receiver base station 160, reducing the likelihood that an unintended base station in an adjacent cell will also receive the reverse link signal 170.

The weight control component settings used for transmission of signals over the reverse link 170 also cause the elements 101 to optimally receive forward link signals 180 transmitted from the base station 160, and reduce the reception of signals from other adjacent base stations. Due to the controllable nature and the independence of the weight control components for each antenna element 101, only forward link signals 180 arriving from a direction that is more or less in the location of the base station 160 are optimally received. The elements 101 naturally reject other signals that are not transmitted from directions proximate the intended forward link signals 180. In other words, a directional antenna is formed by adjusting the weight control components of each element 101.

Figure 2B:
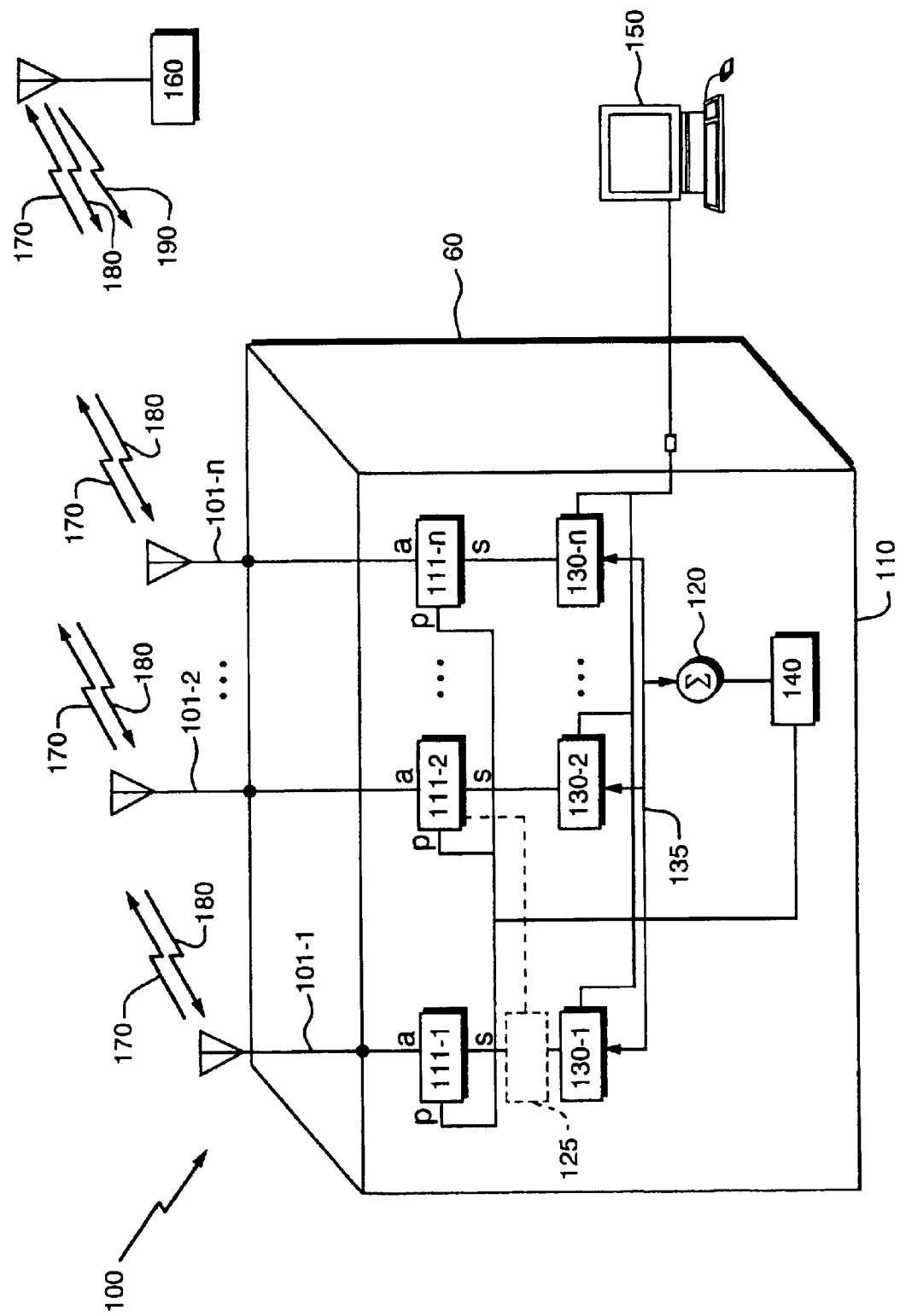
FIG. 2b illustrates another configuration of an antenna apparatus.

It should be understood that there are alternate embodiments of the antenna elements 101 and receiver 130. As shown in FIG. 2b, a plurality of antenna elements 101-1, 101-2, . . . , 101-m again are associated with a like plurality of weight control components 111-1, 111-2, . . . , 111-n. There are in this embodiment a different plurality of transceivers 130-1, 130-2, . . . , 130-n. The splitter/combiner 120 connects to all transceivers 130 in this embodiment. In one such an embodiment, n=m so that there is a transceiver 130 associated with each element 101. However, other RF combiner/splitters 125 might be used to support arrangements where n does not equal m, by combining signals associated with one or more antenna elements 101.

Regardless of whether the FIG. 2a or FIG. 2b embodiment is used, the weight control component 111 settings, in accordance with the teachings of the present invention, are first established by a coarse adjustment wherein all weight control components 111 are simultaneously adjusted to point the antenna beam. In lieu of adjusting the weight control components 111, a plurality of weight vectors are used. Each weight vector represents an antenna directional angle and each contains a values or element, one element for each weight control component 111. As the weight control components are adjusted (or vector elements applied to each weight control component), a signal quality metric (e.g. signal to noise ratio, power or signal to interference ratio ($E_o/I_o$)) is monitored to find the optimum (i.e., minimum or maximum, dependent on the specific metric) signal quality metric value. Since all weight control components 111 are simultaneously adjusted in this coarse mode, the antenna beam shape remains unchanged while the antenna beam rotates through azimuth angles. Once the optimum signal quality metric value has been identified, the weight control components 111 are decoupled from each other and then independently adjusted to fine tune the antenna beam pattern.

This inventive technique of coarse adjustment followed by fine adjustment reduces the time required to achieve an optimal antenna beam pattern. Absent the coarse adjustment step, the independent adjustment of each of the weight control components 111 involves the adjustment of independent parameters (representing, more generally, n degrees of freedom) and therefore, takes longer to converge to an optimum beam pattern. Beginning the process with one only one degree of freedom, by simultaneously changing all of the weight control components 111, achieves a generally optimal antenna pattern quickly; to be followed by the fine adjustment process for determining the optimal antenna pattern. The coarse adjustment/fine adjustment process converges more quickly to the final optimal antenna beam pattern than prior art techniques.

The summation network 120 is coupled to the signal terminal S, of each weight control component 111. During transmission, the summation network 120 provides a reverse link signal to each of the weight control components 111. The weight control components 111 affect the correction of the reverse link signal by imparting a weight (in one embodiment, a phase shift) to the input signal, as determined by a control input signal P to each weight control component 111. Differentiating the reverse link signals 170 transmitted from each element 101 causes constructive or destructive interference with the signals transmitted from the other elements. In this manner, the interfering signals combine to form a strong composite beam for the reverse link signals 170 in the desired direction. The imparted weight provided to each antenna element 101 determines the direction in which the composite beam is transmitted.

The weight control components 111 used for transmission from each antenna element 101, also provide a similar effect on a forward link signal 180 that is received from the base station 160. That is, as each element 101 receives a signal 180 from the base station 160, (prior to the adjustment of the weight control components 111) the respective received signals are out of phase with each other due to the physical separation of the elements 101 on the base 110. However, each received signal is shifted by the weight control components 111. The adjustment brings each signal in phase with the other received signals 180. Accordingly, the signal quality metric associated with the composite received signal, produced by the summation network 120, is maximized.

To optimally establish the weight value for each of the weight control components 111, weight control values are provided by the controller 140. Generally, in the preferred embodiment, the controller 140 determines these optimum weights during idle periods when the laptop computer 150 is neither transmitting nor receiving payload or informational data via the antenna 100. When the station 60 is operating in this idle state, a predetermined signal, that is transmitted from the base station 160 and is received at each antenna element 101 serves as the basis for adjusting the weight control components 111 to optimize reception of such as by maximizing the received signal energy or other link signal quality metric.

The exact type of predetermined signal 190 used to adjust the weight control components 111 depends upon the exact type of system 100. In the case of a CDMA cellular system the predetermined signal 110 can be a forward link pilot signal or access channel signal. In the case of a WLAN system 100, the predetermined signal 190 can be a beacon frame, a Barker sequence, or similar predetermined bit pattern. Other suitable predetermined signals 190 can be preambles, trainers sequences, or similar signals that can be known, apriori, at the receiver.

The controller 140 thus determines and sets an optimal weight for each weight control component 111, to optimize reception of the forward link pilot signal 190. When the antenna 100 enters an active mode for transmission or reception of signals between the base station 160 and the laptop 150, the weight as set by each of the weight control components 111 remains as set during the previous idle state.

Before a detailed description of the weight-setting computation as performed by the controller 140 is given, it should be understood that the invention is based in part on the observation that the location of the base station 160 relative to any one mobile station (i.e., laptop 150) is approximately circumferential in nature. That is, if a circle is drawn around a mobile station 60 and base station locations are assumed to have a minimum of one degree of granularity, the base station 160 can be located at 360 possible angular locations. The combination of the n weights, (one value for each of the n weight control components 111), optimizes the antenna pattern at an angular sector within the 360° circle. Minimal sector widths are attainable with the process according to the present invention for establishing the weight values.

In accordance with the teachings of the present invention, a two-step process is employed to determine the optimal weights. First, the controller 140 simultaneously adjusts all of the weight control components 111 through a series of values. For example, all of the weight control components 111 can be simultaneously adjusted so that the central axis of the antenna beam pattern steps through five degree intervals, resulting in 72 different angular positions around the 360 degree circle. The control signal input to each of the weight control components 111 for changing the weights to scan the antenna beam can be read from memory locations within the controller 140. The index into the memory locations is the desired antenna beam angle and the output is five weights to be applied to the P terminal of each of the weight control components 111 for pointing the antenna beam in the desired direction. At each beam location the response of the receiver 130 to the pilot signal is determined. In one embodiment of the present invention the antenna rescan process is performed while the station 60 is in the idle state. The scanning process can also be performed on a known set of data transmitted from the base station 160 during the active mode. After incrementing through all directional angles in the 360 degree circle (or a predetermined sector of the circle if the base station 160 is known to be in a certain direction relative to the mobile station 60) and detecting the receiver response for each directional angle, the weight combination (i.e., one for each of the weight control components 111) having the optimal receiver response, as measured by any one of a number of receiver metrics (for instance, maximum signal to noise ratio, bit error rate, the ratio of energy per bit, $E_b$, or energy per chip, $E_c$, to total interference, $I_o$ or to total noise, $N_o$) is determined and the weight control components 111 are reset to those weight values.

Next, the weight control components 111 are decoupled and each is independently controlled by inputting independent weight values to the P terminal of each, until the optimum signal quality metric is identified. This fine adjustment approach eventually determines a weight for each of the weight control components 111 that produces the optimum signal quality metric, as determined from the received pilot signal.

It should also be noted that although FIG. 2*a* illustrates a splitter/combiner 120 (operating in conjunction with the transceiver 130) through which all signals received by and transmitted from the elements 101 pass, this element is not a necessarily required according to the teachings of the present invention. In another embodiment, as shown in FIG. 2*b*, each element 101 can be connected directly to a transceiver 130 for receiving and transmitting signals, where the weight control components 111 are interposed between each element and its corresponding transceiver. Each transceiver can individually determine the signal quality metric of the signal received at its associated element and the five (or n in the more general case) resulting signal quality metrics provided as an input to the controller 140 for determining a combined signal quality metric and in response thereto establishing the weights for each element as disclosed herein. In essence, the teachings of the present invention can be applied to a plurality of cooperating antenna elements for locating the optimum directional angle for the antenna, independent of the specific processing methodology for the signals received and transmitted through each of the elements.

Figure 3:
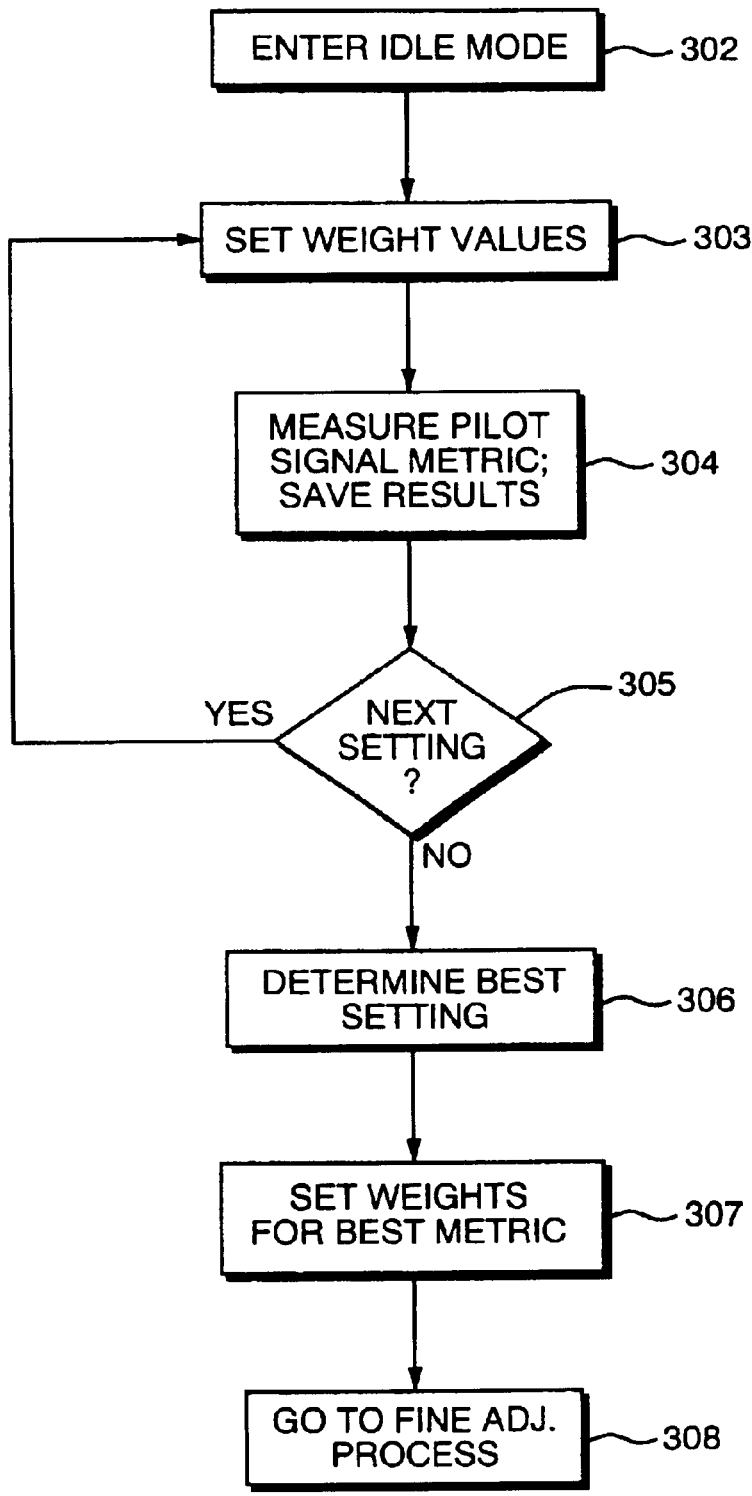
FIG. 3 is a flow chart of the processing steps performed to optimally set the weight value for the signal transmitted from or received by each antenna element.

FIG. 3 shows steps 302 through 307 performed by the controller 140 according to one embodiment of the invention for achieving the optimum signal quality metric (i.e., the optimum antenna directional angle) during the coarse adjustment phase. In lieu of the controller 140, a general purpose microprocessor or a dedicated microprocessor within the station 60 can be programmed to execute the processes set forth in FIGS. 3 and 4. As discussed above, the process of scanning the antenna beam angles, in both the coarse and fine modes, can be performed while the station 60 is in the idle state. In order to determine the optimal coarse weight values for the weight control components 111, steps 302 through 306 are performed during idle periods of data reception and transmission by using the pilot signal 190 transmitted from the base station 160. However, in another embodiment of the present invention, the rescan process can be performed using known data transmitted from the base station 160 during the active operational state of the station 60. The signal quality metrics are determined for the known data and the coarse and fine adjustment processes are performed as set forth in FIGS. 3, 4 and 5.

At a step 302, the controller 140 determines that the station 60 is in the idle state, such as by detecting the absence of certain forward link signals 180 or the presence of the predetermined signal 190. At a step 303 weights are established for each of the weight control components 111 and in response the antenna beam pattern is pointed in a first or relative 0 degree azimuth angle. The step 303 is the first step in a rescan loop that executes once for each directional angle assumed by the antenna 100, in search of the optimum directional angle. As the loop executes, the weights associated with each of the weight control components 111 are modified so that the antenna 100 scans to a different angular direction with every pass through the loop. The weights may, for example, be precalculated and stored in a table, with one weight for each element 101 for each possible antenna angle. In other words, step 303 programs each weight control component 111 for a first angle, which may be conceptualized as angle 0 in a 360 degree circle surrounding the mobile station 60. At a step 304 the station 60 (or in another embodiment, the laptop computer 150) determines a signal quality metric for the received predetermined (e.g., pilot) signal 190, as output from the summation network 120. The measurement in step 304 reflects how well each antenna element 101 detected the received predetermined signal 190 based upon the current set of weights applied at the step 303. The signal metric value is stored at the step 304. The metric may, for example, be a link quality metric such as bit error rate or signal energy to noise energy per chip ($E_c/N_o$).

The step 305 then returns processing to the step 303 where the weights are jointly modified by the controller 140 to change the directional angle of the antenna 100. In one embodiment, this adjustment is accomplished by selecting another weight vector from among the stored vectors, and using the vector elements as the weight values. In one embodiment, this adjustment is accomplished by selecting another weight vector from among the stored vectors, and using the vector elements as the weight values. The steps 302 through 305 repeat until the antenna 100 has been scanned through the desired directional angles, and a signal quality metric value measured for each angle. Once the step 305 determines that all desired directional angles have been scanned, a step 306 determines the optimum set of weights as determined by the setting that produced the optimum (largest or smallest, as the dictated by the chosen signal metric) received signal metric value. A step 307 then programs the weight control components 111 with the set of weights that was determined to produce the best result.

Figure 4:
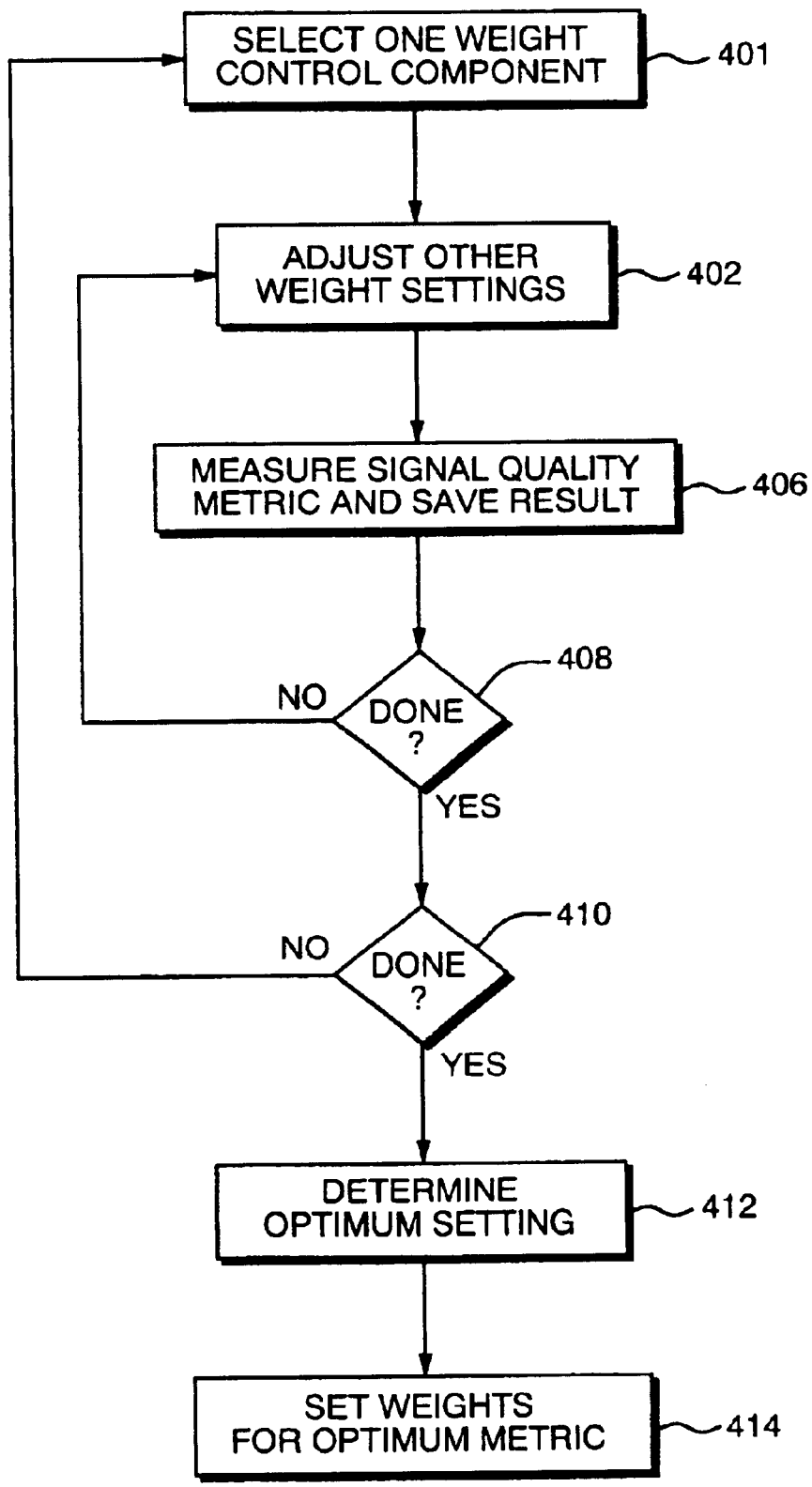
FIG. 4 is a flow chart of steps performed by a perturbational algorithm to optimally determine the arrangement of antenna elements.

Once the coarse adjustment process of FIG. 3 is complete and the weight values set for the best signal quality metric at the step 307, a step 308 indicates that processing moves to the fine weight adjustment process of FIG. 4.

The fine adjustment process of FIG. 4 begins at a step 401 where one of the weight control components 111 is selected for holding at a constant value while the weights of the weight control components are varied. At a step 402 the remaining weight control components are modified. In one embodiment the weight control components are adjusted or incremented in accordance with a predetermined algorithm or in fixed incremental values. The use and characteristics of an algorithm for optimizing a metric where there are N degrees of freedom are well known in the art. Then the quality signal metric is measured and saved at a step 406. The saved value is associated with the unique weights set at the steps 401 and 402. The process continues executing through the loop formed by the steps 402, 406 and 408, adjusting the four weight control components each time processing moves through the step 402. The granularity of the weight adjustments executed at the step 402 is determinable by the system user. After all the possible settings for the varied weight control components have been utilized, the decision step 408 returns a positive response and the process proceeds to the decision step 410, where a negative response is obtained until all the weight control components have been selected at the step 401. Therefore, another weight control component is selected to hold at a constant value (the step 401) and the others are adjusted as the process executes through the steps 402, 406 and 408 again.

An affirmative response from the decision step 410 moves processing to a step 412, where the best setting for the weight control components 111 is determined. Recall that at the step 406 the predetermined signal metrics were measured and saved. Therefore, processing at the step 412 involves checking the saved signal quality metric values to identify the optimum value. At a step 414, the weights for the weight control components 111 associated with the best or optimum signal metric value are determined and the weight control components 111 are adjusted in accordance with those values. At this point, both the coarse and fine adjustment processes have been completed and the antenna pattern determined by the weights at the step 414 is an optimum pattern.

During periods of idle time, the FIGS. 3 and 4 processes can be repeated to compensate for the movement of the antenna 100 relative to the direction and orientation of the base station 160 and changes in the physical environment that cause changes in the interference pattern. In addition, the antenna 100 may be optimized during transmission of information signals by processing through the FIGS. 3 and 4 flowcharts, when known data is received by the station 60 so that the signal metric values of the received signal are suitable for comparison and identification of the optimum signal quality metric.

Figure 5:
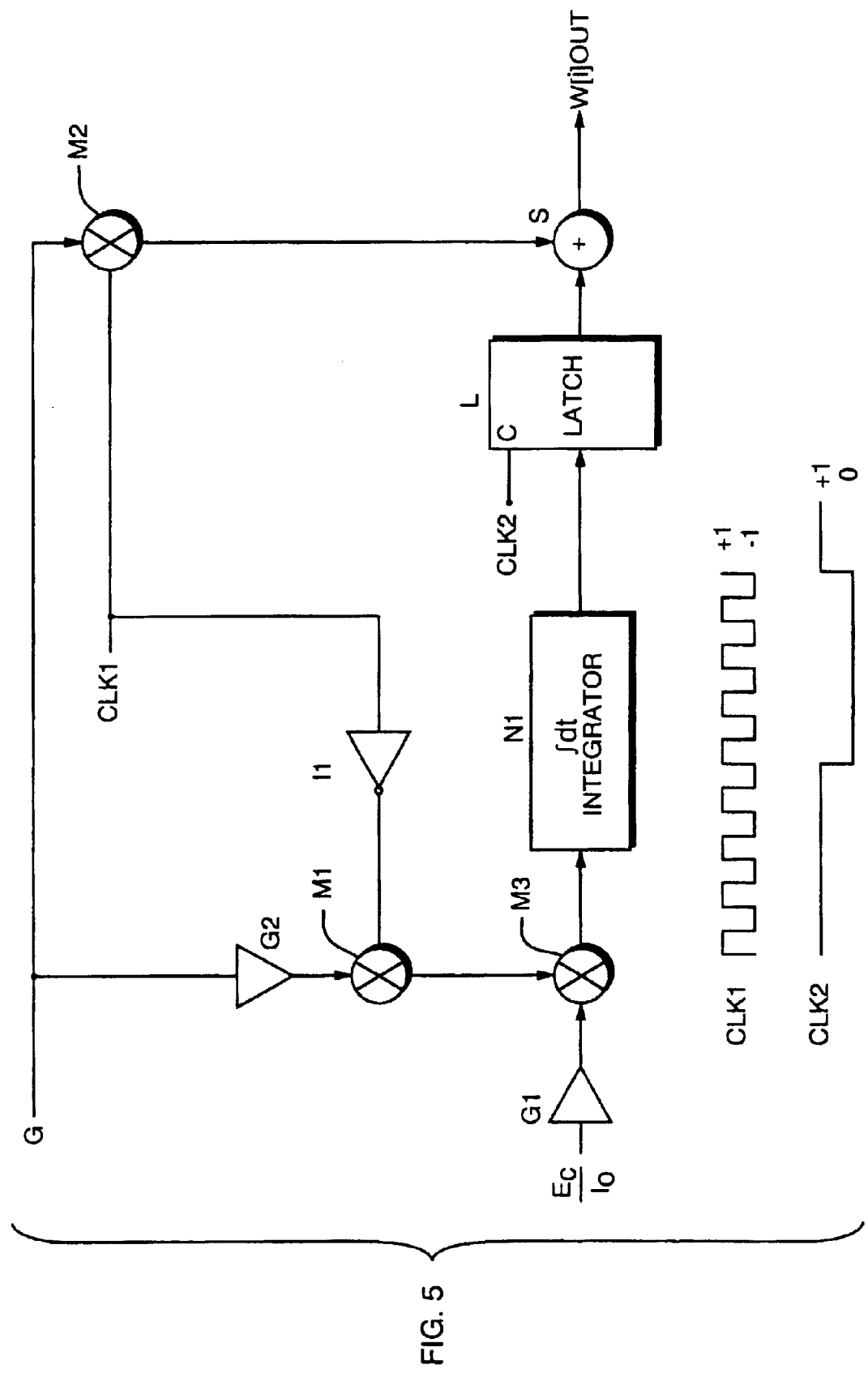
FIG. 5 illustrates a flow diagram for a perturbational computational algorithm for computing the weights to be assigned to each antenna element.

FIG. 5 illustrates a schematic of electronic components for implementing a perturbational algorithm to determine optimal weights for each antenna element 101, as required for the FIGS. 3 and 4 processes.

For example, if n=5, the algorithm fixes a value for four of the five unknown, optimum weights W[i], e.g. W[2] through W[5]. The algorithm perturbs the system and observes the response, adapting to find the optimum arrangement for the unfixed weight, e.g. W[1]. The measured link quality metric, in this case $E_c/I_o$, is fed to a first gain block G1. The control loop gain setting, G, of the input is fed to a second gain block G2. A first fast clock, CLK1, which alternates from a value of "1" to a value of "−1" is inverted by I1 and fed to a first multiplier M1. The other input of multiplier M1 is fed from the gain block G2.

The output of M1 is fed to a multiplier M3 together with the output of the first gain block G1. An integrator N1 measures an average level and provides this value to the latch L. A slow clock CLK2, typically alternating at a rate which varies between "1" and "0" and is much slower than CLK1 (by at least 100 times) drives the latch clock C. The output of the latch L is summed by summation block S with the non-inverted output from M2. The result, W[i], is a value which tends to seek a localized minimal value of the function to be optimized.

The process shown in FIG. 5 is then repeated by setting the first weight to W[1] and then determining W[2] by varying W[3] to W[5] in accordance with the FIG. 5 process. The process continues to find the optimum value for each of the five unknown weight settings.

It should be understood that the process is similar when the number of antenna elements is not equal to five.

Alternatively, in the coarse mode instead of incrementally varying the weight setting for each antenna element 101, the weight for each element can be stored in a table of vectors, each vector having n elements representing the n weight control settings for the weight control components 101. The values in each vector can be computed in advance based upon the angle of arrival of the received predetermined signals. That is, the values for each antenna element are determined according to the direction in which the base station is located in relation to the mobile station. In operation, the angle of arrival can be used as an index into the table of vectors and the weight control components set to the weight represented by the elements of the selected vector. By using a table with vectors, only the single angle of arrival calculation needs to be performed to properly set the coarse weights for each antenna element 101. The weight adjustment process of FIG. 4 then executes.

The antenna apparatus in preferred embodiments of the invention is inexpensive to construct and greatly increases the capacity in a CDMA interference limited system. That is, the number of active stations within a single cell in a CDMA system is limited in part by the number of frequencies available for use and by signal interference limitations that occur as the number of frequencies in use increases. As more frequencies become active within a single cell, interference imposes maximum limitations on the number of users who can effectively communicate with the base station. Intercell interference also contributes as a limiting factor to cell capacity. Given the ability of the present invention to converge quickly, by using the coarse and fine processes, provides quick and accurate adaptation of a mobile station to changes in the angle and location relative to the base station 160.

Since this invention adaptively eliminates interference from adjacent cells and selectively directs transmission and reception of signals from each mobile unit equipped with the invention to and from the base station, an increase in the number of users per cell is realized. Moreover, the invention reduces the required transmit power for each mobile station by providing an extended directed beam towards the base station.

Alternative physical embodiments of the antenna include a four element antenna wherein three of the elements are positioned at corners of an equilateral triangular plane and are arranged orthogonally and extend outward from that plane. The fourth element is similarly situated but is located in the center of the triangle.

Further, the teachings of the present inventions are applicable to an antenna comprising a plurality of elements, where less than all of the elements are active elements, i.e., for radiating or receiving a signal where the other elements serve as parasitic elements to reflect, redirect or absorb some portions of the emitted signal to advantageously shape the transmitted beam in the transmit mode and similarly advantageously affect the receive beam pattern. The elements can be operative in either the active or parasitic mode as determined by an element controller.

Figure 6:
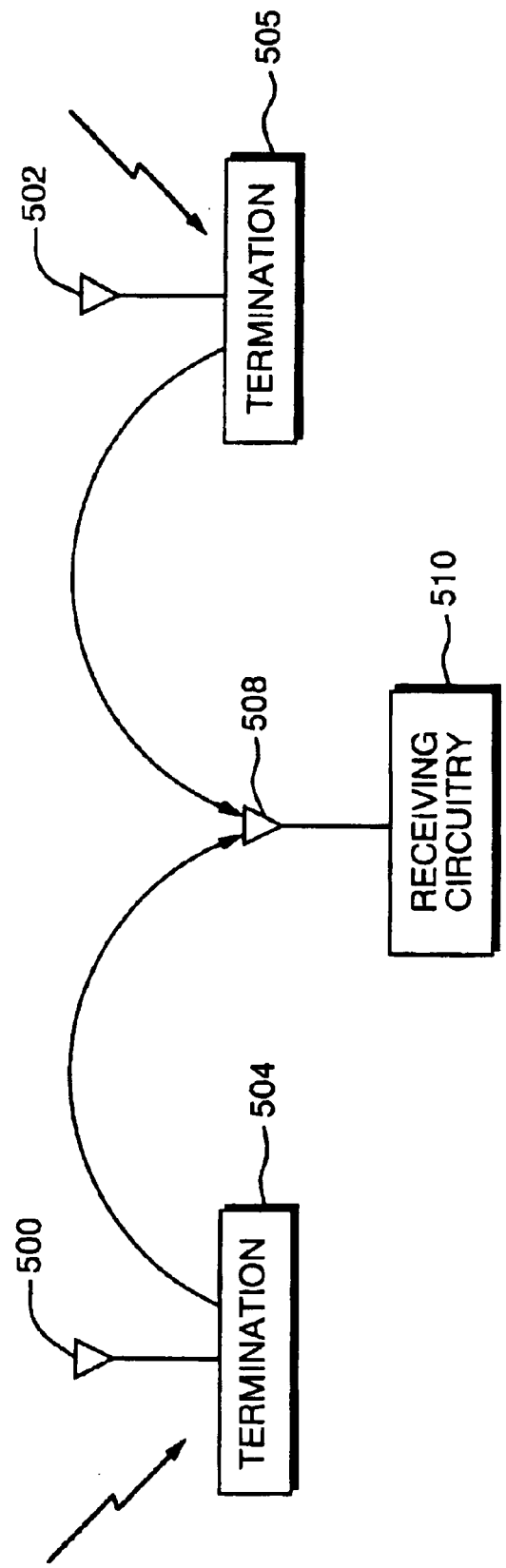
FIG. 6 illustrates another antenna embodiment.

FIG. 6 illustrates such an antenna embodiment including both parasitic and active elements. Parasitic elements 500 and 502 are connected respectively to terminations 504 and 506. An active element 508 is connected to conventional receiving circuitry 510, such as that shown in FIG. 2*a*. Although FIG. 5 illustrates two parasitic elements and a single active element, it is known by those skilled in the art that the fundamentals associated with FIG. 6 are extendable to n parasitic elements and m active elements. In one embodiment, for instance, the teachings of the present invention can be applied to parasitic elements one each arranged at the four corners of a rectangle and the active element at approximately the rectangle center.

In operation, a signal is received at each of the parasitic elements 500 and 502 as shown. The signal is then carried to the terminations 504, 506, respectively, and reflected back therefrom through the elements 500 and 502. The terminations 504 and 506 comprise any one of the following: a phase shifting device, a weight control component (such as the weight control components 111 of FIG. 2*a* or 2*b*) an impedance termination and a switch. The terminations 504 and 506 control both the amplitude and phase, only the phase, or only the amplitude of the signal input thereto, and thereby produce a reflected signal having a certain relationship (i.e., amplitude and phase characteristics) with respect to the received signal. The reflected signals are radiated from the elements 500 and 502, and effectively combined upon receipt at the active element 508. It is seen that the FIG. 6 embodiment accomplishes these three primary objectives of an antenna array: receiving the signal at an element, imparting a phase or amplitude shift to the received signal and combining the received signals. Although the FIG. 6 configuration has been explained in the receiving mode, it is known by those skilled in the art that in accordance with the antenna reciprocity theorem a like a function is achieved in the transmit mode.

While this invention has been particularly shown and described with references to preferred embodiments, those skilled in the art will realize that various changes in form and details may be made therein without departing from the spirit and scope of the invention as defined by the appended claims. Those skilled in the art will recognize or be able to ascertain using no more than routine experimentation, many equivalents to the specific embodiments of the invention described herein. For example, there can be alternative mechanisms for determining the proper weights for each antenna element, such as storing weights in a linked list or a database instead of a table. Moreover, those skilled in the art of radio frequency measurement techniques understand there are various ways to detect the angle of arrival and signal quality metrics of a signal, such as the received predetermined signal. These mechanisms for determining the signal angle of arrival and signal quality metrics are meant to be contemplated for use by this invention. Once the location is then known, the proper weights for weight control components may be quickly obtained. Such equivalents are intended to be encompassed within the scope of the claims.

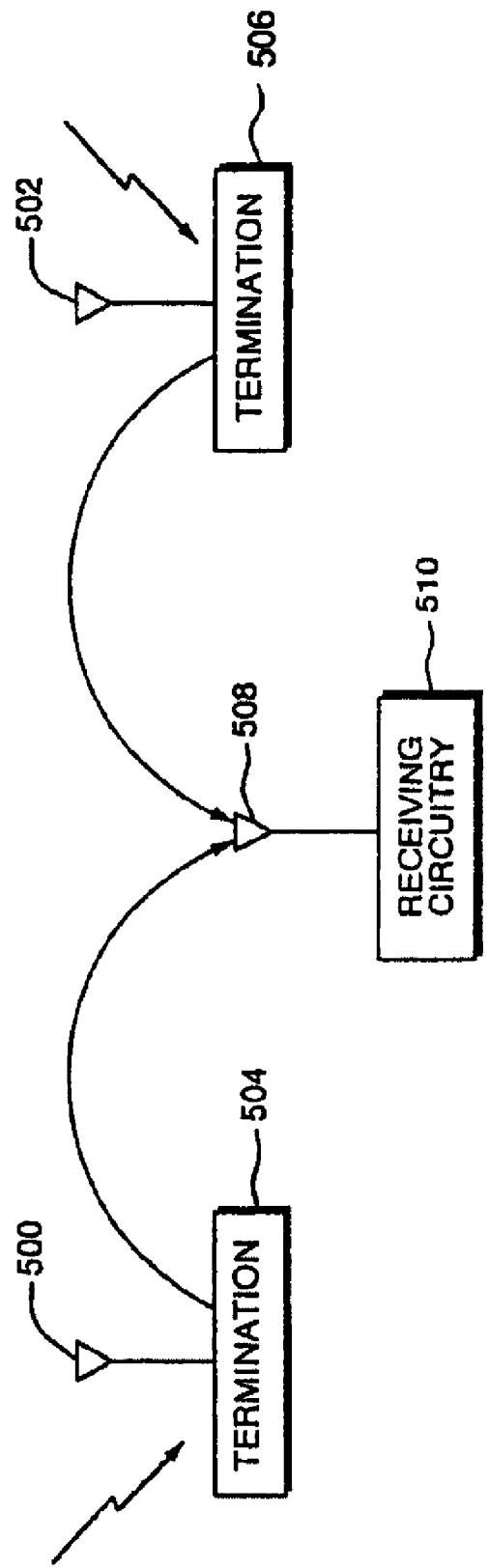

What is claimed is:

1. A method for setting optimal weight control component arrangements for a plurality of antenna elements of a transceiver, the method comprising the steps of:

(a) receiving a predetermined signal from each of the plurality of antenna elements;

(b) combining the received predetermined signal detected from each of the plurality of antenna elements to produce a combined received predetermined signal;

(c) determining a signal quality metric for the combined received predetermined signal;

(d) jointly adjusting the weight control components associated with at least two of the plurality of antenna elements in the station in response to the signal quality metric of the received predetermined signal;

(e) repeating the step (d) until an optimum signal quality metric is achieved;

(f) independently adjusting the weight control components in response to the signal quality metric of the received predetermined signal; and (g) repeating the step (e) until the determined signal quality metric of the combined received predetermined signal reaches an optimum value.

2. The method of claim 1 wherein the signal quality metric is the ratio of received signal energy to interference.

3. The method of claim 1 wherein the signal quality metric is the ratio of received signal energy to thermal noise.

4. The method of claim 1 wherein the signal quality metric is received signal power.

5. The method of claim 1 wherein each weight control component includes a phase shifter.

6. The method of claim 1 wherein each weight control component includes an amplifier and a phase shifter.

7. The method of claim 1 wherein each weight control component includes an electromagnetic coupler.

8. The method of claim 1 wherein the steps (d) and (f) include adjusting the amplitude, phase or the amplitude and the phase imparted to the output signal from the plurality of antenna elements.

9. The method of claim 1 including a plurality of transceivers, wherein said plurality of transceivers comprises a first plurality of stations and a second plurality of base stations, wherein the step (a) is executed at the beginning a communication session between a station from among said first plurality of stations and a base station from among said second plurality of base stations.

10. The method of claim 1 wherein the optimum value of the signal quality metric exceeds a predetermined value.

11. The method of claim 1 wherein the predetermined signal is a pilot signal.

12. The method of claim 1 wherein the predetermined signal is a beacon frame.

13. The method of claim 1 wherein the predetermined signal is selected from the group consisting of a preamble, Barker, training or other apriori sequence known at the receiver.

14. The method of claim 1 wherein step (b) of combining further comprises, after adjusting weight control components for at least two specific received predetermined signals, a step of combining the specific received predetermined signals prior to combining other received predetermined signals.

15. The method of claim 1 wherein the adjustment of the weight control components occurs when the station is in an active state.

16. The method of claim 1 wherein the weight control components are jointly adjustable in a first mode and independently adjustable in a second mode to optimize the signal received at the antenna elements by reducing the interference caused by signals that are not transmitted from an intended base station.

17. The method of claim 1 wherein the weight control components are jointly adjustable a first mode and independently adjustable in a second mode to optimize the signal transmitted to a selected base station via the antenna elements by reducing the interference caused to other base stations.

18. The method of claim 1 in which multiple base stations transmit code division multiple access signals on a common carrier frequency.

19. The method of claim 18 wherein the code division multiple access signals are transmitted within a cell, each cell containing a base station and a plurality of mobile stations, each mobile station having an antenna apparatus.

20. The method of claim 1 wherein a plurality of stations and at least one base station comprise a system for providing wireless local area network communications between a plurality of mobile stations an access point.

21. A method for setting optimal weight control component arrangements for a plurality of antenna elements connected to a plurality transceivers, the method comprising the steps of:
(a) receiving a predetermined signal, from the plurality of antenna elements;
(b) combining the received predetermined signals, detected at each of the plurality of transceivers, to produce a composite received predetermined signal;
(c) determining a signal quality metric for the composite received predetermined signal;
(d) jointly adjusting the weight control components associated with at least two of the plurality of antenna elements in response to the signal quality metric of the received predetermined signal;
(e) repeating the step (d) until an optimum signal quality metric is achieved;
(f) independently adjusting the weight control components in response to the signal quality metric of the received signal; and
(g) repeating the step (e) until the determined signal quality metric of the composite received predetermined signal reaches an optimum value.

22. The method of claim 21 wherein the signal quality metric is the ratio of received signal energy to interference.

23. The method of claim 21 wherein the signal quality metric is the ratio of received signal energy to thermal noise.

24. The method of claim 21 wherein the signal quality metric is received signal power.

25. The method of claim 21 wherein each weight control component includes a phase shifter.

26. The method of claim 21 wherein each weight control component includes an amplifier and a phase shifter.

27. The method of claim 21 wherein each weight control component includes an electromagnetic coupler.

* * * * *

UNITED STATES PATENT AND TRADEMARK OFFICE
CERTIFICATE OF CORRECTION

PATENT NO. : 6,933,887 B2
DATED : August 23, 2005
INVENTOR(S) : Regnier et al.

It is certified that error appears in the above-identified patent and that said Letters Patent is hereby corrected as shown below:

Drawings,
Replace Sheet 7 consisting of FIG. 6 and replace with new FIG. 6 attached.

Column 3,
Line 50, delete "may be" insert -- may --.

Column 4,
Line 57, delete "for predeteremined" insert -- for a predetermined --.

Column 6,
Line 26, delete "each base stations" insert -- each base station --.

Column 7,
Line 50, delete "101-m" insert -- 101-n --.

Column 8,
Line 1, delete "a values or" insert -- a value or --.
Line 23, delete "with one only" insert -- with only --.

Column 9,
Line 3, delete "such as by" insert -- such by --.

Column 10,
Line 17, delete "a necessarily" insert -- necessarily --.

Column 11,
Line 32, delete "as the dictated" insert -- as dictated --.
Line 37, delete "values set" insert -- values are set --.

Column 14,
Line 14, delete "a like a" insert -- a like --.

Column 15,
Line 44, delete "adjustable a first" insert -- adjustable in a first --.

UNITED STATES PATENT AND TRADEMARK OFFICE
CERTIFICATE OF CORRECTION

PATENT NO. : 6,933,887 B2
DATED : August 23, 2005
INVENTOR(S) : Regnier et al.

It is certified that error appears in the above-identified patent and that said Letters Patent is hereby corrected as shown below:

Column 16,
Line 11, delete "an access" insert -- and an access --.
Line 14, delete "plurality transceivers" insert -- plurality of transceivers --.

Signed and Sealed this

Seventh Day of February, 2006

JON W. DUDAS
*Director of the United States Patent and Trademark Office*